United States Patent [19]

McXinnon

[11] Patent Number: 4,849,063
[45] Date of Patent: Jul. 18, 1989

[54] MANUAL EDGE BANDER APPARATUS

[76] Inventor: James A. McXinnon, No. 4 Holmesdale Road, Toronto, Ontario, Canada, M6E 1Y1

[21] Appl. No.: 251,766
[22] Filed: Oct. 3, 1988
[51] Int. Cl.⁴ .......................... B32B 35/00; B32B 31/12
[52] U.S. Cl. ..................................... 156/391; 156/547; 156/575; 156/577; 156/578; 156/579
[58] Field of Search ............... 156/391, 499, 500, 538, 156/543, 547, 575, 577, 578, 579

[56] References Cited

U.S. PATENT DOCUMENTS

| | | | |
|---|---|---|---|
| 1,901,908 | 3/1933 | Hoyos | 156/575 |
| 4,067,762 | 1/1978 | Rhoads | 156/250 |
| 4,240,867 | 12/1980 | Diegel | 156/577 |
| 4,409,060 | 10/1983 | Janssens | 156/497 |
| 4,613,396 | 9/1986 | Scarborough | 156/391 |
| 4,623,421 | 11/1986 | Cardin | 156/579 |

OTHER PUBLICATIONS

Advertising Sheet for Hafele Table Edgebander, Cat. No. 004.02.416.
Commercial Literature for Holz-Her Edge-Banding Machines 1408/1410.

Primary Examiner—Michael Wityshyn
Attorney, Agent, or Firm—Ridout & Maybee

[57] ABSTRACT

A portable appartus for bonding non-adhesive edging or veneer to the edge of a board comprises an applicator for melt adhesive mounted to the frame of the apparatus and carried in advance of a supply of trim edging and roller means for pressing the trim edging against the board edge at a contact position and for drawing trim edging from the supply toward the contact position, as the apparatus is moved manually along the horizontal edge of a board to be trimmed.

10 Claims, 3 Drawing Sheets

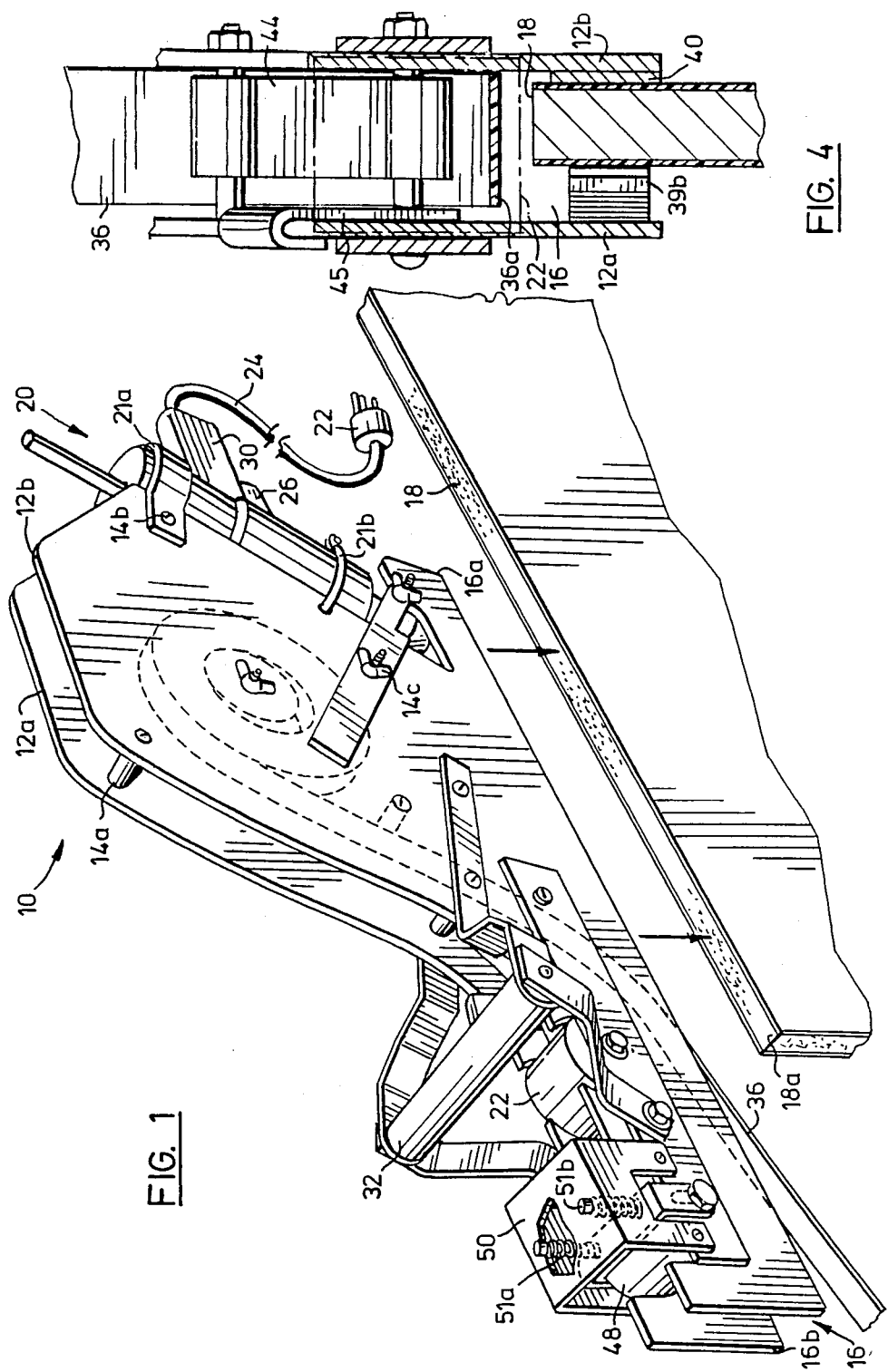

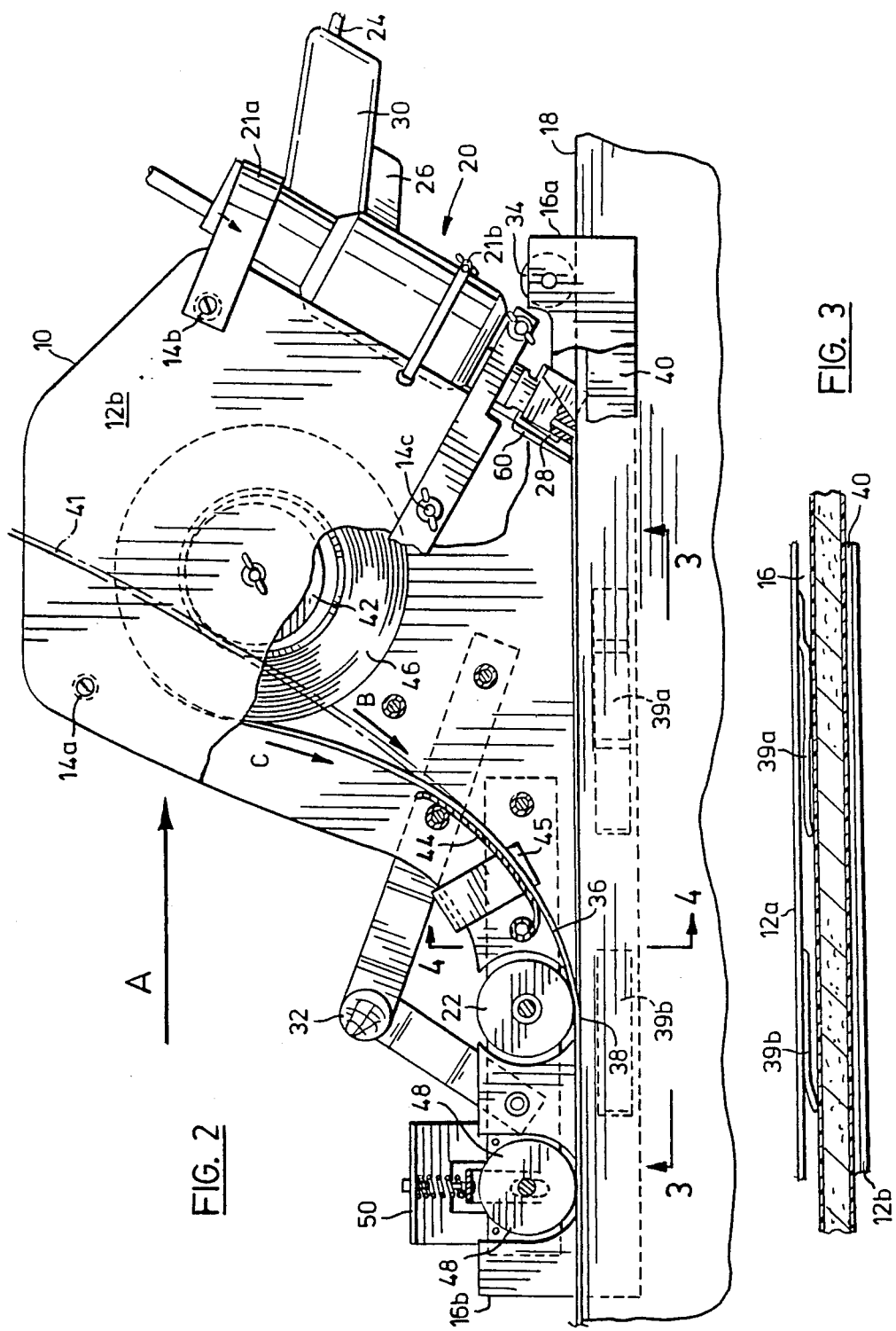

MANUAL EDGE BANDER APPARATUS

This invention relates to portable apparatus for bonding non-adhesive trim edging or veneer to the edge of a board, by carrying a melt adhesive applicator over the edge in conjunction with and in advance of the supply of trim edging. Any of a wide variety of non-glued trim edging materials, such as PVC trim tape, wood veneer or laminates may be applied using the apparatus of the present invention.

Various devices are known for the application of preglued trim tape to the edges of a board, as exemplified by the apparatus of U.S. Pat. No. 4,067,762 (Rhoads) and U.S. Pat. No. 4,409,060 (Janssens). Such devices operate on the principle of directing heat at a band of tape which is coated on one surface with a heat-sensitive adhesive, in advance of a pressure roller.

In the production of high quality, custom made furniture, however, the usual pre-glued trim edging materials such as paper or polyester tapes are often inadequate. In smaller cabinet-making manufacturing operations, higher quality materials such as real wood veneer and arborite laminates, are typically hand-glued to the workpieces on site. Large commercial edge banding machines used in woodworking operations for the production of quality furniture also include glue application stations. However, such automated woodworking machinery, costing tens of thousands of dollars and entailing substantial set-up times for changing board sizes, is not appropriate for use in small jobs or small shops.

It is an object of the present invention to provide portable edge bander apparatus of a simple and relatively inexpensive construction, which can easily be taken to different shops or work sites and used for applying high-quality trim edging material to tables, cabinets, etc.

The invention is a portable apparatus for bonding a strip of trim edging to the edge of a board, comprising: mounting means including a pair of fixed parallel walls forming an open-ended channel at the bottom thereof to receive the board edge to be covered; handle means attached to the mounting means permiting an operator to grasp the apparatus, place the leading end of said channel over one end of said board, and move the apparatus manually along the board toward the other end thereof, with the board edge recessed within said channel; means for retaining the board edge at a constant lateral positioning between the walls of said channel; melt adhesive delivery means carried by said mounting means, operable to deliver a controlled stream of melt adhesive into said channel near the leading end thereof to deposit a coating of melt adhesive onto said board edge as said mounting means is moved therealong; trim edging guide means carried by said mounting means to receive a strip of trim edging and guide said strip into alignment against said board edge within said channel at a selected contact position disposed toward the trailing end of said channel; and applying means carried by said mounting means for pressing trim edging from said guide means against said board edge at said contact position, so that said strip of trim edging is drawn through said guide means and pressed against said coating of melt adhesive by the applying means as the apparatus is moved along the length of the board.

The apparatus may optionally be provided with a spool dispenser of flexible trim edging carried by the mounting means for supplying a continuous strip of trim edging to the guide means.

A preferred embodiment of the invention will now be described by way of example and with reference to the accompanying drawings, in which:

FIG. 1 is an isometric view of a manual edge bander apparatus according to the invention;

FIG. 2 is a side elevational view of the apparatus, partly broken away, shown in use applying a strip of trim edging to the edge of a board;

FIG. 3 is a sectional view in the direction 3—3 of FIG. 2;

FIG. 4 is a sectional view in the direction 4—4 of FIG. 2;

Figure 5:
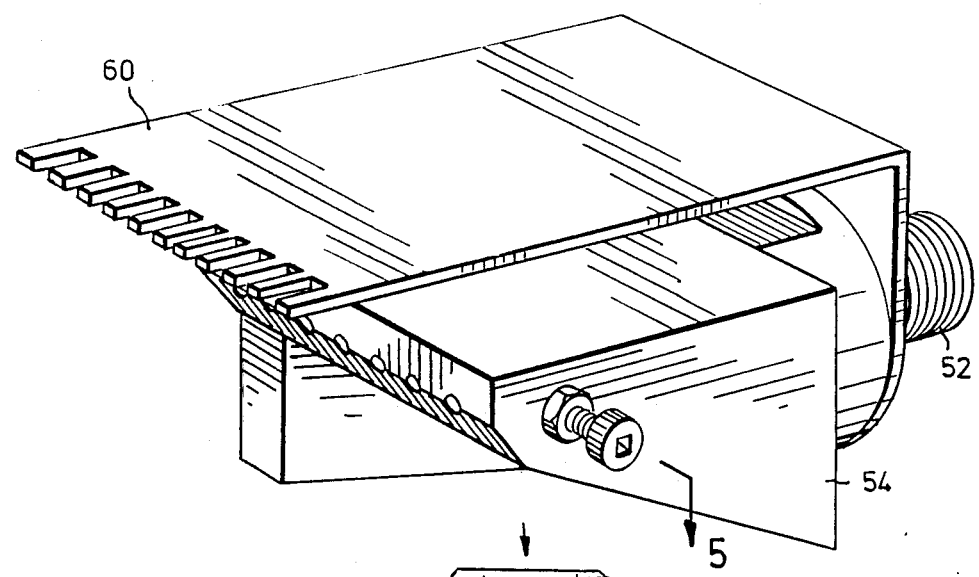
FIG. 5 is an isometric view of a particular embodiment of glue dispenser nozzle useful in the invention.

The structure and concept of the invention are illustrated in FIGS. 1 to 4. The manual edge bander comprises a frame 10 to which all of the working components are secured. In a preferred embodiment, the frame is constructed of two parallel plates 12a and 12b, demountably secured in spaced relation by spacers bolted between the plates as at 14a, 14b and 14c. These plates may be constructed of thick acrylic plastic or other rigid structural materials. The bottom portions of plates 12a and 12b define a channel 16 which is adapted to be fitted over and to receive the edge 18 of a board to be trimmed. The board is clamped or otherwise held in a fixed position, with edge 18 horizontal.

Disposed toward the leading end 16a of channel 16 is a conventional electric glue gun 20, such as a Bostik Model 260, mounted to frame 10 by clamping bands 21a and 21b and connectable to an electrical power outlet through plug 22 and cable 24. By controlling the pressure on trigger 26, the operator can deliver a varying flow of melt adhesive through nozzle 28 of gun 20.

In operation, an operator will commence the trimming of board edge 18 by taking the apparatus by gun handle 30 and handle 32 and fitting the leading end 16a of channel 16 over the starting end 18a of board edge 18. The apparatus is then drawn over the board edge in the direction of arrow A in FIG. 2, with the gun nozzle 28 in close proximity to the surface of edge 18, while a coating of melt adhesive is deposited along that surface in advance of the trim edging. The leading end 16a of the channel receiving the board edge may usefully include a small idle roller 34, mounted between plates 12a and 12b in advance of nozzle 28, to assist in guiding channel 16 manually over the starting end 18a of board edge 18 at the commencement of the trimming operation.

Disposed toward the trailing end 16b of channel 16, mounted to frame 10, is an application roller 22. As best seen from FIGS. 2, 3 and 4, showing the edge bander in use being drawn over a board edge 18 recessed within channel 16, a strip of trim edging 36 feeds between roller 22 and board edge 18. In the sectional view of FIG. 4, the vertical position of roller 22 is shown in dotted outline, roller 22 being positioned behind i.e. to the trailing side of section 4—4.

As the operator moves frame 10 in direction A by handles 30 and 32, applying suitable downward pressure on the latter, trim edging is drawn by roller 22 against the surface of the board edge, over which a suitable layer of cooling melt adhesive has been deposited by the operation of the glue gun.

Undesirable lateral movement between the board edge 18 and the wider channel 16 is prevented by resilient curved plastic strips 39a and 39b fixed to one wall of the channel (the inner surface of plate 12a) to urge the board against an elongate spacer plate 40 of rigid acrylic plastic or other rigid material glued or otherwise fixed to the other wall of the channel (the inner face of plate 12b), as best seen in the sectional views of FIGS. 3 and 4. Strips 39a and 39b act as stiff springs acting transversely to the direction of motion of the apparatus along the board and urges the board and spacer plate 40 together so that, in operation, the board edge 18 is spaced away from either wall of the channel 16 and extends above members 39a, 39b and 18. The trim edging 36, which is wider than the board edge 18, is guided in alignment as described below and applied to the board edge so as to overlap the board edge on both sides.

The apparatus of the invention may be used to apply a pre-cut strip of relatively stiff trim edging, and can also accommodate a spool for dispensing more flexible trim edging, such as PVC trim tape from a continuous roll.

In FIG. 2, a pre-cut strip of veneer being applied to the board edge is indicated, partly in dotted outline, as 41. As strip 41 is drawn toward contact point 38 along the direction of arrow B by the forward motion of roller 22, it is guided and maintained under slight flexion by contact against the surface of a disk 42 and a convexly curved metal tongue 44. Alternatively, a spool of flexible tape 46 may be carried on disk 42 and the tape fed to application roller 22 in the direction of arrow C as the machine is moved over the board edge. In that case, too, curved metal tongue 44 serves to guide the tape smoothly toward contact point 38.

Lateral alignment of the trim edging, whether it be a pre-cut strip of veneer or flexible tape, is effected by a small spacer plate 45 slightly in advance of the point 38 where the tape first contacts the glued board edge 18. In the cross-sectional view of FIG. 4, showing the advancing section 36a of trim edging 36 a short distance ahead of contact point 38, it is seen how the close fit of tape 36 between spacer 45 and wall 12b brings tape 36 into a consistent lateral alignment with the board, with the sides of the tape overlapping the sides of board edge 18.

A range of board thicknesses can be accommodated within channel 16, which is limited by the compressive range of the spring members 39a and 39b. At the same time, different sizes of trim tape can be accommodated and aligned in the apparatus by changing the thickness of spacer plate 45.

Optionally, a second roller 48 is mounted to a compression spring-loaded carriage 50 at the trailing edge of roller 22. The final pressing-out of the applied trim edging by roller 48 against the resistance of compression springs 51a and 51b ensures a smooth application of trim to the glued edge.

The longitudinal distance between the nozzle of glue gun 20 and roller 22 which first brings the trim strip edging into contact with the glued surface is not highly critical, but must be such that for a given composition of melt adhesive and ordinary rates of travel of the apparatus along the board, the time between gluing and pressing trim against a point on the edge face is sufficient for the glue to "take" properly.

Proceeding from a position as illustrated in FIG. 2, the apparatus is drawn along the entire length of the board edge until the trailing rollers 22 and 48 drop off the front end of the board edge. Overhanging trim at the front, rear and sides of the board edge are then cut off using conventional manual tools such as a chisel.

Figure 6:
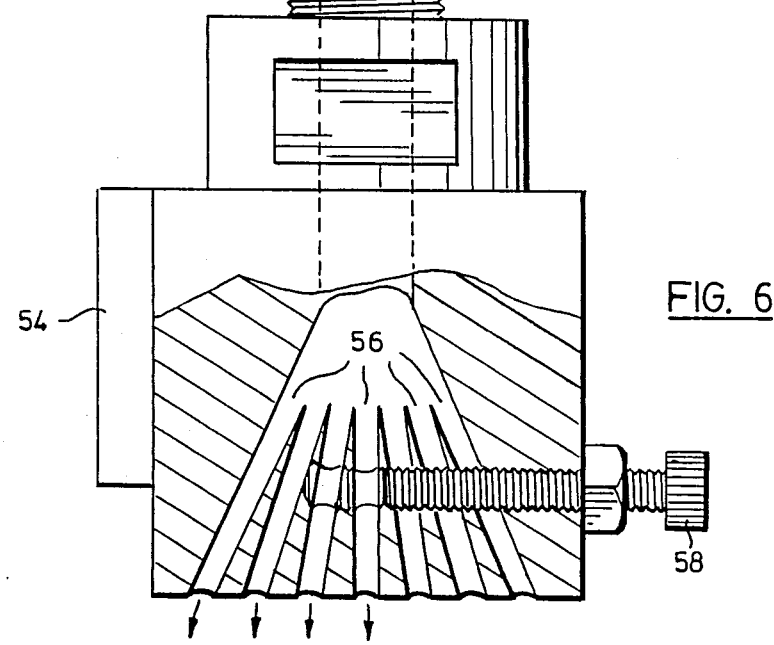
FIG. 6 is a sectional view along the arrow 5 of FIG. 4.

Illustrated in FIGS. 5 and 6 is a glue gun nozzle adapter particularly useful with the apparatus of the present invention. Threaded neck 52 is adapted to be connected to the nozzle part of a conventional glue gun. Nozzle head 54 has an internal manifold of sub-nozzles 56 and is transversely threaded by a bolt 58 which may be advanced to occlude one or more of the sub-nozzles as desired. An effective flow of melt adhesive suited for board edges and tapes over a range of widths is thereby achieved. As indicated in FIGS. 2 and 5, a spreading comb 60 may be provided at the trailing side of nozzle head 54 to ensure a uniform application of adhesive to the board edge.

It is to be understood that the particular form of invention herein shown is merely a preferred embodiment. Various changes may be made in the size, shape and the arrangement of parts, or equivalent means may be substituted for those illustrated and described without departing from the spirit and scope of the invention defined in the claims appended hereto.

I claim:

1. A portable apparatus for bonding a strip of trim edging to the edge of a board, comprising:

mounting means including a pair of fixed parallel walls forming an open-ended channel at the bottom thereof to receive a board edge to be covered, said channel having a leading end and a trailing end;

handle means attached to the mounting means permitting an operator to grasp the apparatus, place the leading end of said channel over one end of said board, and move the apparatus manually along the board toward the other end thereof, with the board edge recessed within said channel;

means for retaining the board edge at a constant lateral positioning between the walls of said channel;

melt adhesive delivery means carried by said mounting means, operable to deliver a controlled stream of melt adhesive into said channel near the leading end thereof to deposit a coating of melt adhesive onto said board edge as said mounting means is moved therealong;

trim edging guide means carried by said mounting means to receive a strip of trim edging and guide said strip into alignment against said board edge within said channel at a selected contact position disposed toward the trailing end of said channel; and applying means carried by said mounting means for pressing trim edging from said guide means against said board edge at said contact position, so that said strip of trim edging is drawn through said guide means and pressed against said coating of melt adhesive by the applying means as the apparatus is moved along the length of the board.

2. Apparatus as defined in claim 1, wherein said means for retaining the board edge comprises resilient spring means on the inner surface of one of said walls and a spacer plate on the inner surface of the other of said walls operable to restrain said board edge and said channel from relative lateral movement as the apparatus is moved along the board.

3. Apparatus as defined in claim 1, wherein said applying means comprises a roller.

4. Apparatus as defined in claim 1, further comprising a spool dispenser of flexible trim edging carried on said mounting means for supplying a continuous strip of trim edging to said guide means.

5. Apparatus as defined in claim 1, wherein said melt adhesive delivery means is an electric glue gun including a nozzle and a handle with a trigger for manual control of the rate of extrusion of molten glue from the nozzle of said gun.

6. Apparatus as defined in claim 5, wherein said handle means comprises the handle of said glue gun and a second fixed handle disposed vertically above said applying means, permitting the operator to control simultaneously the rate of deposition of glue and the pressure exerted against said contact position while moving the apparatus along the board edge to be covered.

7. Apparatus as defined in claim 5, wherein said gun further comprises a comb fixed to the trailing side of the nozzle for smoothly spreading glue from said nozzle against the surface of the board as the apparatus is moved therealong.

8. Apparatus as defined in claim 5, wherein the nozzle of said gun comprises a manifold for dispensing glue in a selected number of parallel streams for application to various thicknesses of board and corresponding widths of trim edging.

9. Apparatus as defined in claim 1, wherein said guide means comprises a plurality of abutment surfaces between said contact position and the free end of a strip of trim edging, so configured and positioned that no substantial bending force is imposed on the strip at any location therealong.

10. Apparatus as defined in claim 3, further comprising a spring-loaded second roller carried by said mounting means and disposed at the trailing side of said applying means.

* * * * *